(12) United States Patent
Akahane

(10) Patent No.: US 6,226,533 B1
(45) Date of Patent: *May 1, 2001

(54) VOICE MESSAGING TRANSCEIVER MESSAGE DURATION INDICATOR AND METHOD

(75) Inventor: Masaaki Akahane, Mahwah, NJ (US)

(73) Assignees: Sony Corporation, Tokyo (JP); Sony Electronics Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/608,835

(22) Filed: Feb. 29, 1996

(51) Int. Cl.$^7$ .................................... H04B 1/38
(52) U.S. Cl. .................. 455/566; 455/550; 455/66; 455/186.1; 455/412; 704/503
(58) Field of Search ................... 455/412, 413, 455/566, 550, 569, 95, 38.4, 66, 186.1, FOR 121; 360/6, 137, 69, 32; 396/264; 340/311.1, 825.44, 539; 348/220, 243, 231; 701/36; 704/201, 212, 229, 501, 503

(56) References Cited

U.S. PATENT DOCUMENTS

| | | | |
|---|---|---|---|
| 4,024,354 | * 5/1977 | Bolick, Jr. et al. | 360/69 |
| 4,134,660 | * 1/1979 | Sakurada et al. | 396/264 |
| 4,249,165 | 2/1981 | Mori | 340/311 |
| 4,295,724 | * 10/1981 | Sahara et al. | 396/264 |
| 4,353,065 | 10/1982 | Mori | 340/825.44 |
| 4,459,008 | * 7/1984 | Shimizu et al. | 396/264 |
| 4,468,813 | 8/1984 | Burke et al. | 455/38 |
| 4,495,647 | 1/1985 | Burke et al. | 455/38 |
| 4,618,860 | 10/1986 | Mori | 340/825.44 |
| 4,701,943 | 10/1987 | Davis et al. . | |
| 4,949,085 | 8/1990 | Fisch et al. | 340/825.44 |
| 4,959,735 | * 9/1990 | Kawai | 348/220 |
| 5,153,582 | 10/1992 | Davis | 340/825.44 |
| 5,214,516 | * 5/1993 | Okino et al. | 360/6 |
| 5,446,598 | * 8/1995 | Takayama | 360/32 |
| 5,481,303 | * 1/1996 | Uehara | 348/231 |
| 5,495,357 | * 2/1996 | Osterhout | 455/66 |
| 5,652,569 | * 7/1997 | Gerstenberger et al. | 340/539 |
| 5,794,164 | * 8/1998 | Beckert et al. | 701/36 |

* cited by examiner

Primary Examiner—Nguyen T. Vo
Assistant Examiner—Lester G. Kincaid
(74) Attorney, Agent, or Firm—Christopher M. Tobin; Harold T. Fujii

(57) ABSTRACT

A message duration indicator apparatus and method for use with a portable voice messaging transceiver including a message recording memory, a microphone, a remaining message memory indicator and an indicator controller provide an indication to the user of the approaching end of the message period to stimulate the user to record a message in as short a time as possible.

15 Claims, 5 Drawing Sheets

VOICE MESSAGING TRANSCEIVER MESSAGE DURATION INDICATOR AND METHOD

FIELD OF THE INVENTION

This invention relates to a voice messaging pager capable of transmitting and receiving recorded voice messages. More particularly, it relates to a message duration indicator, or talk time indicator, incorporated in such a transceiver for displaying time remaining in available message storage memory, and method for doing the same.

BACKGROUND

COPENDING U.S. APPLICATION

The Parvulescu and Zidel U.S. patent application entitled "Two-Way Voice Messaging Terminal Having A Speech To Text Converter" bearing Ser. No. 08/573,624, filed Dec. 18, 1995, and assigned to the same assignee as the instant application, is referenced herein as a source, when issued, for providing details of a pager transceiver having two-way voice messaging capabilities suitable for use with embodiments of the present invention.

Several varieties of wireless personal communication devices (PCD) are currently available for business and personal use. Portable telephones provide the user with freedom from being tethered to a wall mounted conventional telephone jack. Both digital and analog cellular telephone systems provide greater freedom to roam within a service area and provide connectivity with the public switched telephone network (PSTN) from isolated locations, as well as from transportation systems such as planes, trains and automobiles. Cellular devices which handle data as well as voice information are also known. Although frequently very convenient, cellular telephone systems are both relatively complex and relatively expensive for many users. A cellular telephone infrastructure is also relatively expensive to install and maintain. Perhaps as a result, market penetration for cellular services in the United States is currently on the order of about 10% and is even lower in overseas locations.

Another type of currently available communication system, which those of skill in the art would distinguish from a cellular system, is known as a specialized mobile radio (SMR) system. Specialized mobile radio systems using packet data schemes are currently in use, for example, in directing fleets of delivery trucks and to expedite check-in/check-out procedures at rent-a-car vendors. Such systems are frequently text only systems, operated in a broadcast mode to a fleet of subscribers. Specialized mobile radio systems incorporating digital voice messaging capability are disclosed in, for example, Burke U.S. Pat. No. 4,495,647 (issued Jan. 22, 1985) and Burke U.S. Pat. No. 4,468,813 (issued Aug. 28, 1984). Although apparently acceptable for some business and military applications, specialized mobile radio systems (including mobile data systems) are typically too complex and expensive for consumer use and cannot be characterized as having met the needs of the consumer successfully.

A third type of PCD which has become quite popular with the public is a pager. Conventional pagers are small, easy to operate, and provide limited but useful communication capabilities, such as the fact that the user has been telephoned and a telephone number to return a call to, or other brief messages. The information which may be communicated from a message handling center to a remote portable pager is limited both by the memory and display limitations of the pager/receiver device and by communication protocol formats used in the paging industry, discussed, for example in Mori U.S. Pat. No. 4,353,065 (issued Oct. 5, 1982) and U.S. Pat. No. 4,618,860 (issued Oct. 21, 1986).

As discussed above, conventional pagers are typically capable of handling only brief text messages in a receive-only mode. A few known pagers are capable of limited two-way communications, as, for example, through user selection of a short response from among a menu of possible responses, as disclosed in Davis U.S. Pat. No. 5,153,582 (issued Oct. 6, 1992). However, available two-way pagers are limited in several respects. The hardware constraints of the pagers, the communication protocol message link limitations, and the ease of operation both for the person being paged and the person calling the paging service leave much to be desired.

For example, a need exists for a pager which is relatively simple to manufacture and operate, which provides two-way communication and is also relatively inexpensive. An exemplary use of such a device would be for children to communicate with their parents such information as when the children's after school activities are completed or when they have arrived at a location to which they were traveling alone. Moreover, children who cannot read would understandably have difficulty in using conventional pagers. Adults who are not comfortable with modern communication technology and need only to exchange brief messages inexpensively would also be well served by such a device. Finally, visually impaired individuals, and those with limited manual dexterity, such as arthritis patients, are essentially excluded from the benefits provided to the larger population by current paging devices. These individuals may either have difficulty reading current pager displays or in operating the small buttons necessary to compose even a short text message on a conventional pager.

One available improvement on conventional pagers is the provision of a one-way receive-only voice messaging capability. In such a system, analogously to a telephone answering machine or voice mail system, a voice message is received at the message handling center from the PSTN. Next, the analog voice signal is digitized and coded by a device known as a coder/decoder (CODEC) using one of a number of known coding systems. Known voice coding systems include MBE (Multi-Band Excitation), SBE (Single-Band Excitation), SBC (Sub-Band Coding), Harmonic Coding, LPC (Linear Predictive Coding), DCT (Discreet Cosigne Transport), MDCT (Modified DCT), FFT (Fast Fourier Transform), CELP (Code Excited Linear Prediction), VSELP (Vector Sum Excited Linear Prediction) and RPE-LTP (Regular Pulse Excitation—Long Term Prediction), among others. After coding, a message is transmitted by a message handling center, then received, decoded and played by the pager unit. Examples of pagers providing such improvements over conventional paging technology are found in Davis U.S. Pat. No. 4,701,943 (issued Oct. 20, 1987) and Fisch U.S. Pat. No. 4,949,085 (issued Aug. 14, 1990). Such devices, although they represent apparent improvements over the conventional limited message length text pager, still posses ease of use, complexity and cost disadvantages. Most significantly, such devices, because they are one-way receive only pagers, do not meet the special needs of children and the visually impaired for two-way short message communication.

Other unmet needs are evident. For example, the preferred portable voice message transceiver terminal disclosed in the co-pending application uses a solid state memory device to record voice messages to be transmitted by the user. It will be apparent that in such a device, the length of the message to be recorded and sent is by necessity rather short since cost (and to some extent device size) is dependent upon the amount of memory provided, which directly controls maximum message length. Moreover, cost of use is related to length of the transmission. Transmissions may also be limited by communication protocol formats which limit, for example, maximum word length.

Thus, a user of the above discussed devices must necessarily keep his or her message brief However, conventional pagers and similar telecommunication devices have not been faced with the problem of stimulating the user to message brevity. In fact, for cellular telephone devices where fees to the service provider are based upon length of the communication, the economic impetus has been just the reverse.

Thus, a need exists for a duration remaining indicator in voice messaging. It would be advantageous if such an indicator made minimal demands on a user's conscious attention. More specifically, certain categories of two-way voice pager users have special needs for indicators suited to their capabilities, and would benefit from having communication opportunities made move fully available to them through provision of two-way voice pagers incorporating the invention disclosed below.

SUMMARY OF THE INVENTION

According to the present invention, the foregoing and other advantages are attained by providing a portable voice messaging transceiver including a message recording memory, a microphone electrically connectable to the memory, a remaining message memory capacity indicator and an indicator controller. In operation, activation of the microphone causes the remaining message memory capacity indicator to stimulate message brevity in a user by displaying time remaining until maximum predetermined message duration is reached. In accordance with one embodiment, the length of the maximum predetermined message duration depends upon a user selected compression rate. In accordance with another aspect of the invention, a method is provided for stimulating a portable voice messaging transceiver user to record a message within a predetermined time including the steps of initiating a duration indicator at a first rate, maintaining a record of elapsed message recording, comparing the record to a predetermined maximum message length and changing the duration indicator first rate to a second rate in response to the remaining message duration time available.

DESCRIPTION OF THE INVENTION

The various forms of the instant invention will now be described with reference to the attached drawings.

Figure 1:
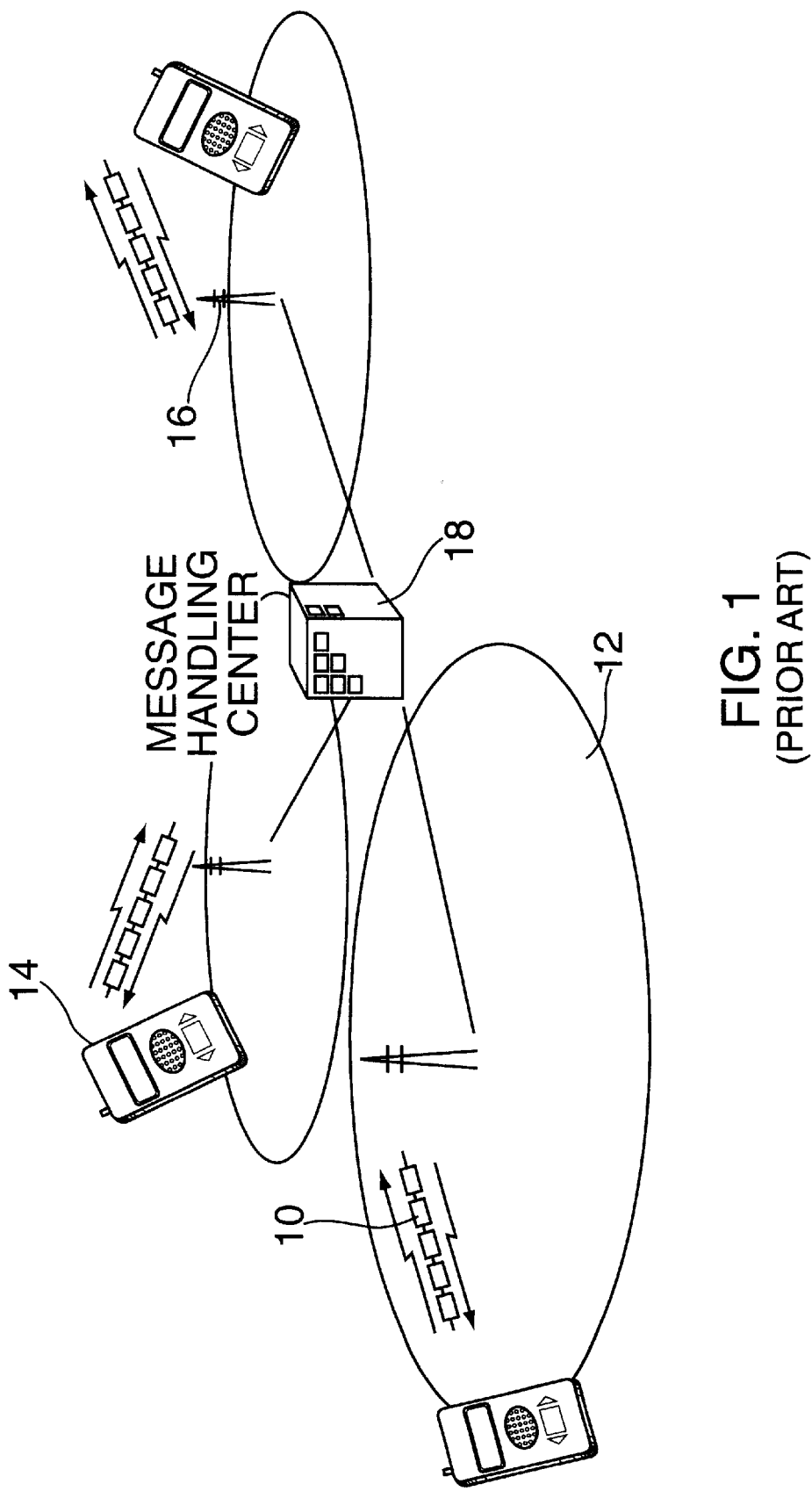
FIG. 1 depicts a wireless packet data communication system incorporating portable voice messaging transceiver terminals related to the present invention.

In the communication system depicted in FIG. 1, message data packets 10 are exchanged between transceiver terminals 14 and the message handling center 18. Although the design of such a system is by no means a simple task, being dependent upon, for example, system capacity and use rates, geography and radio signal fading characteristics, among other factors; it is believed to be within the skill of the art to assemble such a system from off the shelf components. Such a system may either be multi-cellular, as shown, or unicellular, and may or may not include both terrestrial transmission facilities 16 and/or satellite transmission facilities, as would be clear to one of skill in the art. In a preferred embodiment, the system is purely terrestrial, and accomplishes signal coding and formatting appropriate to a known protocol such as the Mobitex, POCSAG, FLEX or other standards. One of skill in the art could also choose from other frequency/protocol combinations, such as a variety of narrowband PCS options.

Figure 2:
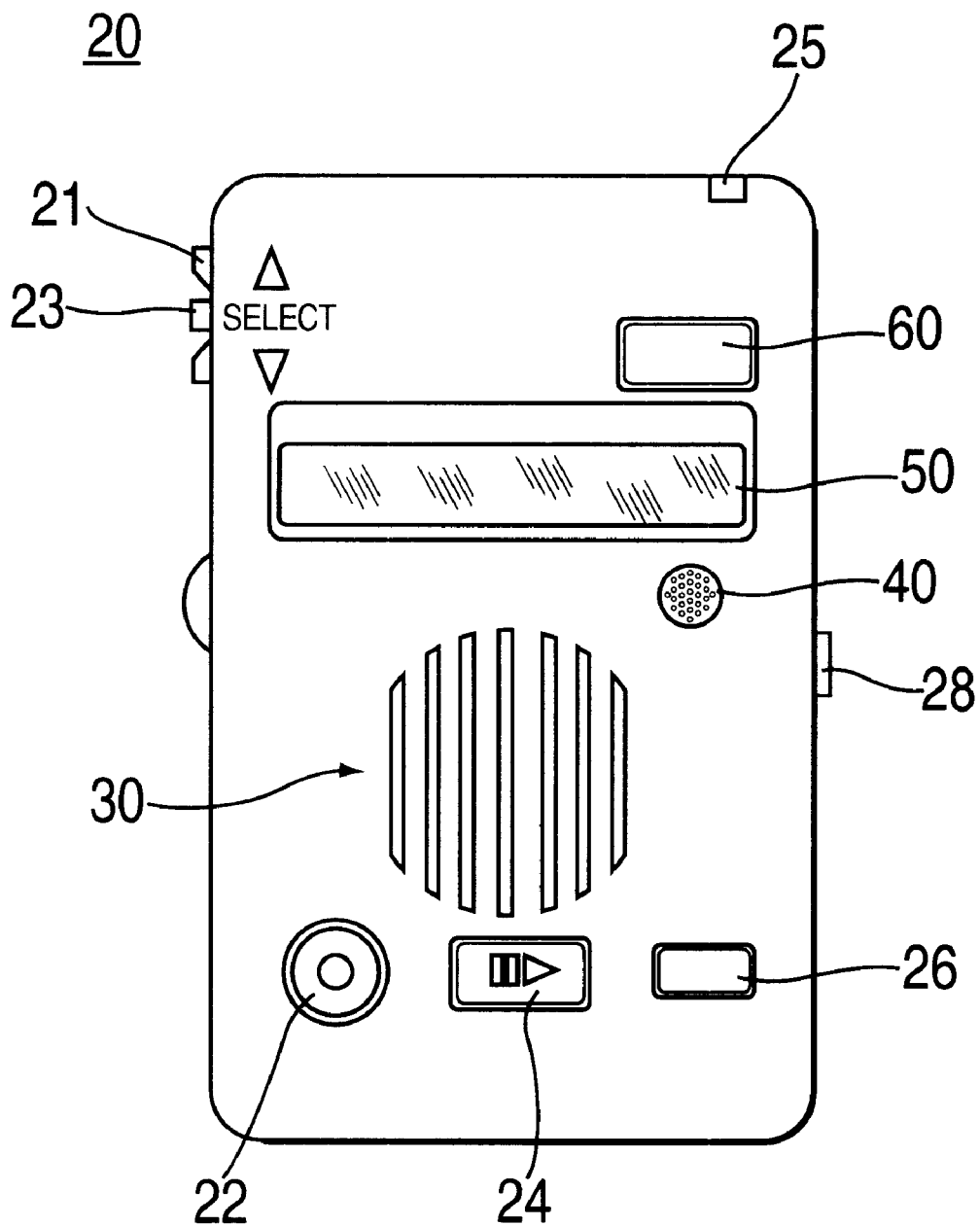
FIG. 2 depicts a portable voice messaging transceiver terminal incorporating one embodiment of the present invention.

The front view of a terminal incorporating one embodiment of the present invention is shown in FIG. 2. An important feature of such a terminal (and of the present invention) is functional and manufacturing simplicity. FIG. 2 depicts a preferred layout of the functional components of a portable voice message transceiver terminal 20, although rearrangement of the keys and displays would be within the scope of the invention. Depicted are a record key 22, playback key 24 and send key 26 for respectively recording, reviewing and transmitting voice messages. A speaker 30 covered by a grille is shown, as is a microphone 40 wherein the user speaks his or her message. A delete key 28 for erasing messages already reviewed or messages not to be transmitted is provided, as is a volume control key 29 for ease of message review. A display 50 is shown whereon, for example, information such as the number of messages stored, the speech rate selected, the destination (or group of destinations) selected and other terminal status and action information may be visually communicated to the terminal user. Preferably, the display is an LCD, although one of skill in the art would be able to substitute several other choices, such as, for example, an array of LEDs. An incoming message indicator 25, preferably an LED, is provided for informing the user that a message is being received. Such an indicator may also be used for indicating the presence of received but unreviewed messages. A destination input key 21 and rate change selector 23 are provided so that the user may select the recipient of the message to be sent as well as the compression rate as is described more fully below.

A duration indicator 60 is also provided in a location which is prominent when the microphone is faced toward the user for use. This indicator, which is preferably a single LED of a distinctive color but which may be an array of LEDs, LCD, or a similarly common display device known to one of skill in the art. An important feature of the preferred duration indicator, which can also be described as a remaining message memory capacity indicator, or a talk time indicator, is that it is visually conspicuous. Unlike a lack luster grey number on a grey LCD which slowly increments, the indicator must grab the user's attention. The design goal for such an indicator is to transmit the information that memory capacity is being depleted (i.e. that a user should complete his or her voice message) without requiring thought or a mental translation by the user. In fact, the duration indicator should ideally implicitly stimulate the user to record brief messages. A flashing light which increases in rate of flashing is preferred, and an increase from a rate of about two flashes per second (2 Hz) to about 3 Hz in the final 20% of remaining message memory capacity is especially preferred. The duration indicator could conceivably be co-located with the display 50. But this is not preferred as co-location does not serve the important goals of making the message duration indicator stand out easily, and allowing users to implicitly or unconsciously grasp the amount of time remaining when recording their message.

It will be appreciated that display of elapsed time or remaining time as numerals on a liquid crystal display, for example, could often be unsatisfactory. First, such a display may be difficult to comprehend unless the user is capable of devoting full attention to a display. If, for example, the user is engaged in other activities such as driving a car, a display must require as little conscious attention as necessary or it may pose a safety hazard. Moreover, children too young to read, or individuals with some types of visual difficulties, may not be able to readily use such a device.

Figure 3:
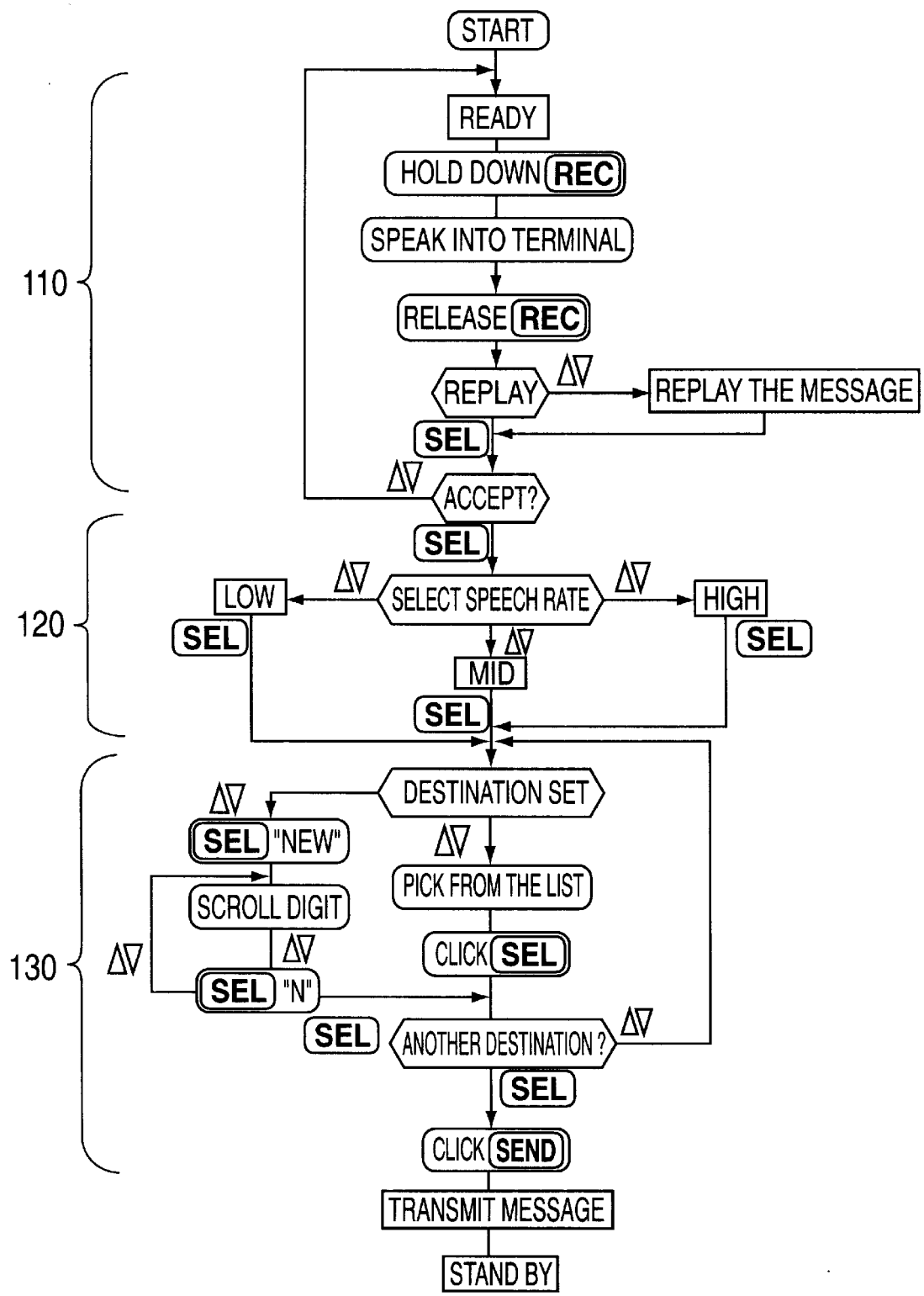
FIG. 3 is a flow chart illustrating a method of use of a portable voice messaging transceiver adapted for use in the present invention.

The sequence of operation of a portable voice messaging terminal adapted to the instant invention is shown in FIG. 3. When ready to begin recording a message, the user would hold down a recording button 22 and begin speaking a message into the terminal microphone 40. In a preferred embodiment, when the record button is depressed, or, alternatively, when the microphone detects a sound, the duration indicator 60 commences flashing at a preselected first rate. Preferably, the first flashing or blinking rate is constant, and slightly faster tempo than a human's normal resting heartbeat, approximately two flashes per second, for example. It is believed that this rate naturally and intuitively affects human viewers. Of course, many alternate fixed rates, or variable rates such as a slowly increasing flashing rate, would be within the scope of the invention and easily selectable by those of skill in the art based on well known ergonomic engineering teachings.

Alternative embodiments to a single visually conspicuous LED include multiple LED arrays. For example, an array of wedge shaped LEDs disposed to form a circle could be used to count down the message memory capacity remaining (which is of course directly proportional to message duration remaining for use by a user) by lighting all the wedges on initial recording and periodically turning off one of the wedges with passage of time. For example, if ten wedges were used to form the circle and a maximum ten second message time were available, one wedge per second could be turned off (or on) to implicitly stimulate the user to message brevity. A bar graph-type display created from a LED array counting either up or down might also be acceptable. Finally, any of these displays could be replaced with other visual display elements, such as LCD displays, micro bulbs, etc. However, LEDs are preferred both for reduced power consumption and for color brightness and overall visual conspicuousness.

As the user continues recording his or her message, the duration indicator display changes to indicate the amount of message memory capacity remaining available to the user. For example, when a predetermined portion of the total message memory capacity has been filled, the display is changed in a visually conspicuous manner to induce the user to complete his or her message. In the preferred embodiment, each message to be sent may be restricted to a certain time length, in this example, ten seconds. Continuing the example, once 80% of the allocated solid state message memory of the preferred embodiment has been filled with a message, the duration indicator LED commences flashing at a faster tempo, preferably about three flashes per second until the end of the remaining 20% of total predetermined maximum message length, here two seconds. The LED may be shut off, or give another indication, after the maximum length of the recording time.

As shown in FIG. 3, once the user has completed speaking the message into the portable voice messaging transceiver, she releases the recording button 22. At this time, the duration indicator 60 is extinguished. The user is then presented with the option of replaying and revising the message through any of a number of iterations or accepting the message.

Next, in one embodiment, the user is presented with the opportunity to select the speech rate at which the message will be encoded. FIG. 3 depicts a choice of three levels, low, medium and high, although of course more or fewer choices would be achievable by one of skill in the art. The selection of speech rate also need not occur after recording the message but could occur before. In operation, a user would preferably record his or her message at the highest rate which would be indicative of the least compression and the highest speech quality. Then, after recording the message, the user could select a lower speech quality, higher compression alternative and play the message back to see if playback quality was sufficient at the lower speech quality/ higher compression setting. If the user accepts the playback quality, then a reduced amount of speech data will be sent to the message destination as a result of selecting a lower bit rate CODEC. Transmission of a smaller amount of data would reduce air time costs. Although it is anticipated that for a given embodiment, the transmission rate would be fixed by the service protocol programmed into a device, there is no reason that a multiple transmission rate device could not be built, although such is not believed to be economically advantageous or desirable to consumers.

Although the CODEC may be implemented as a process carried out in a digital signal processor, and any CODEC and above-discussed encoding/decoding algorithms may be used in the implementation of the subject invention, a preferred CODEC uses Multi-Band Excitation (MBE) to encode a speech message in real-time into a bitstream in the range of 3.6 to 2.4 Kbps. This equates to a compression ratio 8.8:1 to 13.3:1 as compared with a 32 Kbps PCM representation. Even further real-time voice compression is expected in the near future, and it will be appreciated that the CODEC used in connection with the present invention is meant to encompass such compression technology.

Continuing in FIG. 3, the user next is allowed to select the destination or recipient for the voice message to be transmitted. Typically, this would involve either selecting a destination from a pre-entered list or entering a new message destination/recipient. In one embodiment of the portable voice messaging transceiver specifically adapted for use by children, this destination set procedure could be fixed or locked with the children's parents as the recipient, thus simplifying operations and ensuring the message is sent to the right location. Another embodiment would allow a group of destinations be selectable such that, for example, members of a project team could all be simultaneously paged with one message transmission by a user. As in the case of selecting speech rate, the destination setting procedure need not be performed in the order shown in FIG. 3 but could occur prior to message recording or at any other user selectable time prior to message transmission. Having selected both speech rate and destination/recipient(s) and having recorded and accepted the voice message, the user then depresses the send button 26 to transmit the message. Following message transmission, the portable voice message transceiver automatically reverts to a stand-by mode.

In an embodiment of a portable voice message transceiver incorporating the present invention especially adapted to the needs of the visually impaired, the duration indicator 60 need not be a visual indicator. An audio indicator, for example, a beep tone with an increasing beep rate and/or tone frequency, might be implemented, even though this would likely interfere with message recording somewhat. Preferably, the message duration remaining indicator of this embodiment could provide a tactile indication, such as a vibration or low frequency buzzer of selectively increasing rate as remaining time decreases.

In an embodiment of a portable voice message transceiver incorporating the present invention especially adapted for use by children and the visually or manually impaired, operations could be simplified and keys or buttons minimally necessary to send and receive voice messages would be placed in a particularly prominent position or location. For example, the record, playback and send keys 22, 24, and 26 respectively, could be lighted, shaped in distinctive fashions and/or placed differently from that depicted within FIG. 2 to ease operation by any of the individuals having special needs discussed above. In an embodiment specially adapted for use by children, the destination selection function could be locked out by the parents and the record/review functions could, for example, be implemented by use of one button, i.e., push once to record, push twice to review.

In another embodiment, the duration indicator could be caused to display a number of selectable attributes. For example, a first color could be displayed for a first portion of message recording and a second color could be displayed during a subsequent recording portion. Of course, attributes could be changed more than twice, or could be combined. These and other optimizations of the current invention are believed to be within the grasp of those with skill in the art.

Figure 4:
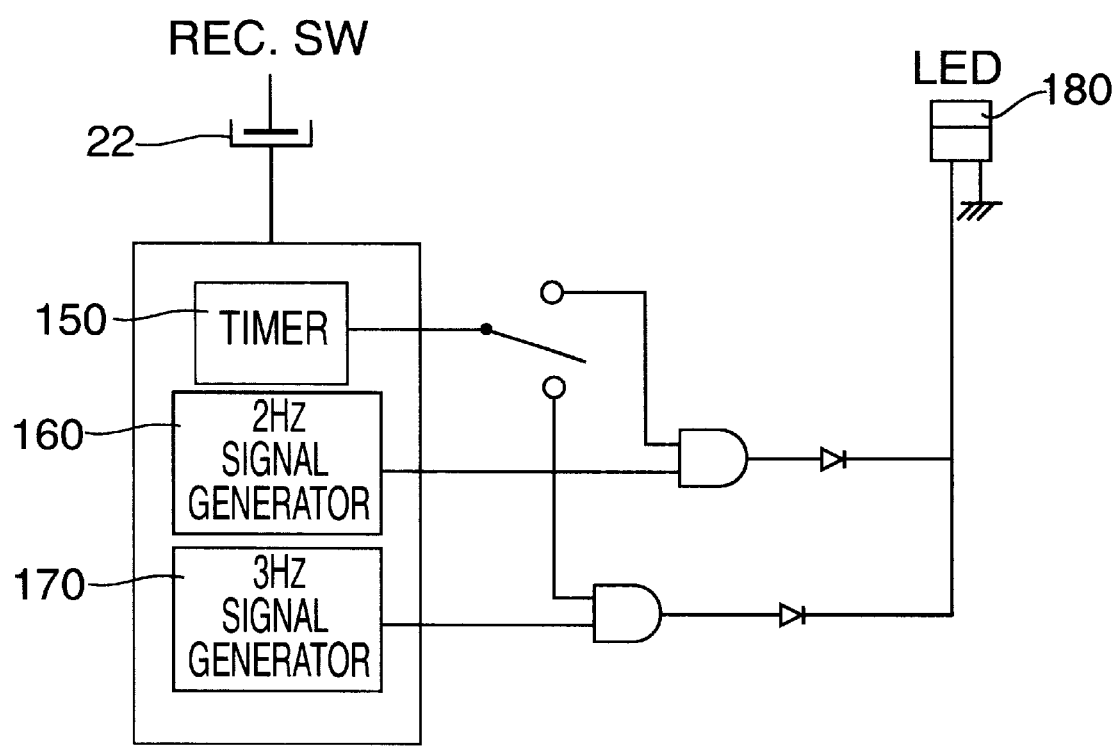
FIG. 4 is a schematic indicating one embodiment of the message duration indicator of the present invention.

FIG. 4 depicts one embodiment of a duration indicator controller block diagram for implementing the present invention. In FIG. 4, depression of the record key 22 by the user initiates a timer which is pre-set to the predetermined maximum message length of the message memory. Preferably the message memory is a solid state recording device, and most preferably one 4M bit static RAM (e.g. a Hitachi HM628512) and supporting digital and analog circuitry, although other acceptable devices could be chosen. So configured, the unit can store up to 1000 seconds of speech at a 4 Kbps compression rate, comprising approximately 60–100 unique recorded or received messages of 10–15 seconds duration each. If a 2 Kbps compression rate is implemented, then storage increases to 2000 seconds and about 130–200 messages. Those with skill in the art will of course realize that the voice storage memory may be organized in blocks as desired to increase addressing speed and may further be organized, for example, by message priority or user selectable message saving such that message memory is not necessarily stored in a first in, first out (FIFO) fashion. Those with skill in the art will also realize that total message length, and total message storage may be easily altered. The limiting parameters for selection of total message memory amount and total individual message duration include cost and size factors for provision of memory, message protocol format factors for designing the transmit/receive sections and acceptable battery life. As the goal of a pager is typically to provide affordable brief messaging, it is believed that a total message duration on the order of 10–15 seconds is optimal.

Continuing with the description of FIG. 4, once the timer 150 has been initiated, either by depression of the record switch 22 or by receipt of a voice signal (voice operated recording mode), the timer begins counting down from the predetermined maximum message length to zero. Initially, the timer is coupled to a first rate LED driver 160, depicted in FIG. 4 as a two hertz signal generator. After a predetermined time, preferably corresponding to approximately 80% depletion of individual message capacity available, the timer selects a second, higher rate LED driver shown in FIG. 4 as a three hertz signal generator 170. This selection by the timer causes the user to perceive an increased flashing rate and to complete his or her message within the available memory capacity. While FIG. 4 depicts a timer and two signal generators of a well-known type, it will be appreciated by those skilled in the art that a number of custom program logic circuits could be utilized to achieve the same controlling function. Thus, at least both physical hardware implementations such as the exemplary embodiment of FIG. 4 and software or firmware stored in a memory portion of a microprocessor duration indicator controller are within the scope of the present invention. A software implementation, for example, if the portable voice messaging transceiver is incorporated into a multi-function personal digital assistant-type device would also be able to be implemented by those with skill in the art without making substantive changes to the present invention.

Figure 5:
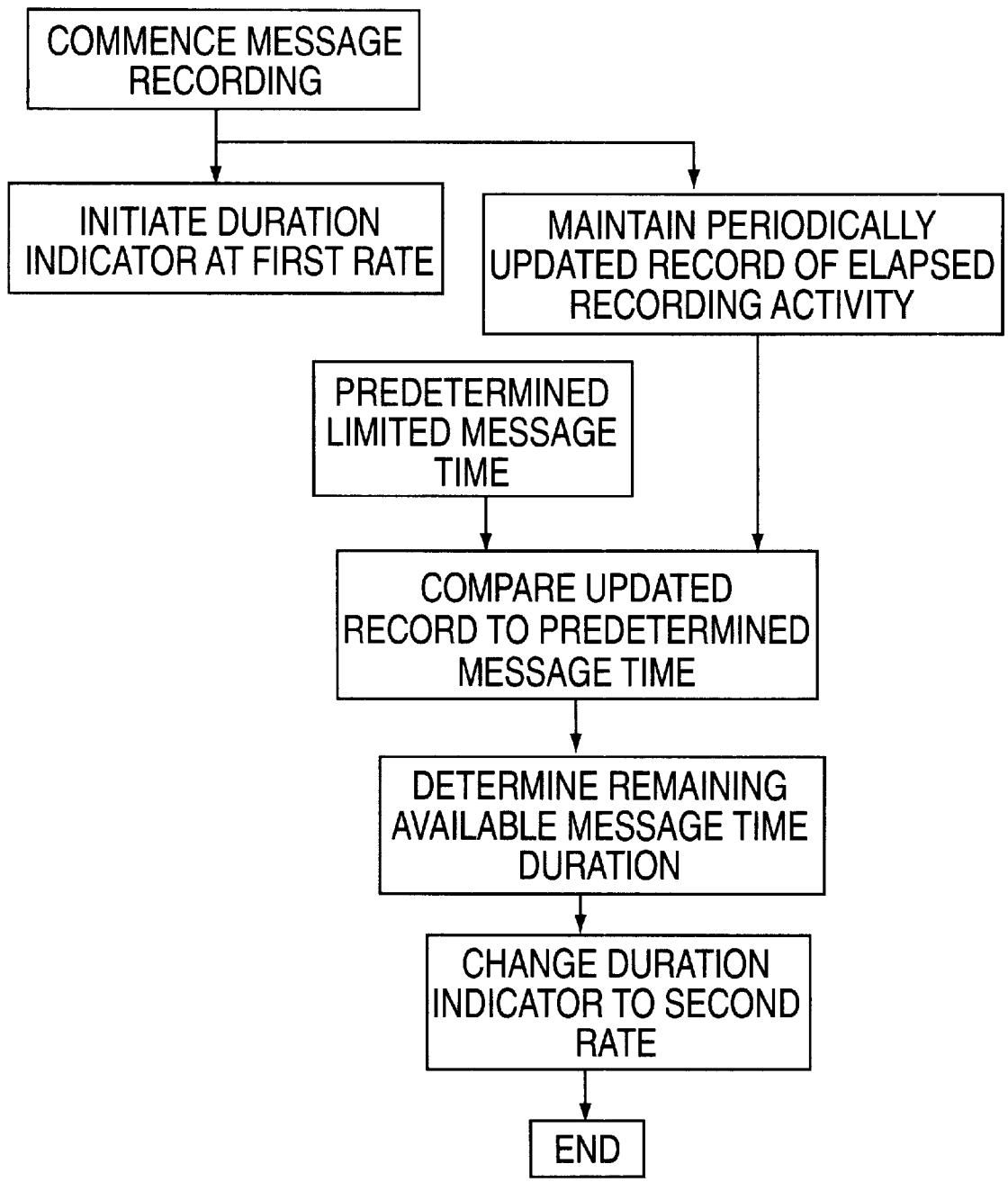
FIG. 5 is a flow chart showing the method of operation of the portable voice messaging transceiver according to an embodiment of the present invention.

FIG. 5 shows the steps of operation in the portable voice messaging transceiver described above.

Finally, several remaining memory message capacity signaling schemes could be adopted that are included within the scope of this invention, for example, several stepped increases in LED flashing rate (as by increasing the number of signal generators shown in FIG. 4) could be implemented. Similarly, a single variable signal generator circuit could be implemented which either provides stepped increases or slowly continuously increasing LED flash rate. Finally, as discussed above, other duration indicators than a flashing LED could be used and controlled in a fashion similar to that shown in FIG. 4 which is well within the skill of those in the art.

Although in the embodiments discussed above the Applicant's invention is described in connection with two-way voice pagers and other PCDs, it will be appreciate by one of skill in the art that the inventive apparatus and method has application outside the pager field. For example, answering machines and audio memo pads among other devices that utilize solid state memories to store voice messages could benefit from the above disclosed invention.

In light of the above description, it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for stimulating a portable voice messaging transceiver user to record a message within a predetermined limited time, comprising the steps of:

receiving a first user selectable compression rate that corresponds to a first quality level for recording a message;

initiating a duration indicator at a first rate in response to a user commencing recording the message;

maintaining a periodically updated record of the user's elapsed message recording activity;

comparing said periodically updated record to said predetermined limited message time to determine a remaining available message duration, said predetermined limited message time being based on the first user selectable compression rate;

changing said first rate to at least a second rate in response to said remaining available message duration to inform the user to record the message in a time shorter than the predetermined limited message time;

receiving a second user selectable compression rate that corresponds to a second quality level for recording the messaged the second quality level being low relative to the first quality level;

playing the message back at the second quality level and receiving user acceptance of the second quality level; and receiving a command to transmit the message to a message destination.

2. The method of claim 1 wherein said indicator comprises a conspicuous visual duration indicator.

3. The method of claim 2 wherein said conspicuous visual duration indicator comprises a flashing LED.

4. The method of claim 3 wherein said first rate is approximately 2 flashes per second and said second rate is approximately 3 flashes per second.

5. A portable voice messaging transceiver comprising:

a message recording memory having a predetermined maximum message duration;

a microphone operatively connected to said memory;

a remaining message memory capacity indicator;

an indicator controller connected to said indicator and connected to said microphone and including means for counting down such that activation of the microphone causes said controller to count down to the predetermined maximum message, said predetermined maximum message duration being based on a first user selectable compression rate having a corresponding first recording quality level, duration and switch means for causing said indicator to display one of a first indication and a second indication to stimulate a user to record a message within a time shorter than said predetermined maximum message duration;

a rate change selector, for receiving a second user selectable compression rate that corresponds to a second recording quality level, the second recording quality level being low relative to the first recording quality level;

a speaker, for playing the message back at the second quality level for user acceptance; and means for receiving user acceptance of the second quality level and for receiving a command to transmit the message to a message destination.

6. The portable voice messaging transceiver of claim 5 wherein said indicator comprises a conspicuous visual remaining memory capacity indicator.

7. The portable voice messaging transceiver of claim 6 wherein said indicator comprises an LED.

8. The portable voice messaging transceiver of claim 6 wherein controller selection of said first indication causes said indicator to flash at a first rate and controller selection of said second indication causes said indicator to flash at a second rate.

9. The portable voice messaging transceiver of claim 8 wherein second rate is greater than said first rate.

10. The portable voice messaging transceiver of claim 8, wherein said first indication is a first color and said second indication is a second color.

11. The portable voice messaging transceiver of claim 10 wherein said first color is green and said second color is yellow.

12. The portable voice messaging transceiver of claim 5 wherein said memory comprises a solid state device.

13. The portable voice messaging transceiver of claim 5 wherein said means for counting down comprises a timer selectably connected by said switch means to a first signal generator and a second signal generator.

14. The portable voice messaging transceiver of claim 13 wherein said first signal generator generates a 2 Hz signal and said second signal generator generates a 3 Hz signal, each of said signals selectably controlling the flash rate of said indicator.

15. A portable voice messaging transceiver comprising:

memory means for recording a voice message of predetermined maximum length, in a predetermined limited message time, said predetermined limited message time being based on a first user selectable compression rate having a corresponding first recording quality level;

means for inputting said message into said memory means;

means for visually indicating the imminence of the expiration of said predetermined message length to a user during inputting of said voice message;

means for regulating said indicating means whereby initiation of message recording results in a first visual display for a predetermined period of time and continued uninterrupted message inputting results in display of at least a second visual display to said user, wherein interruption of the message inputting before the elapse of the predetermined period of time extinguishes the first visual display;

means for receiving a second user selectable compression rate that corresponds to a second recording quality level, the second recording quality level being low relative to the first recording quality level;

means for playing the message back at the second quality level; and means for receiving user acceptance of the second quality level.

* * * * *